March 13, 1962  J. M. JONES, JR  3,024,643
APPARATUS AND METHOD FOR CONTINUOUSLY DETERMINING VISCOSITY
Filed March 20, 1957  2 Sheets-Sheet 1
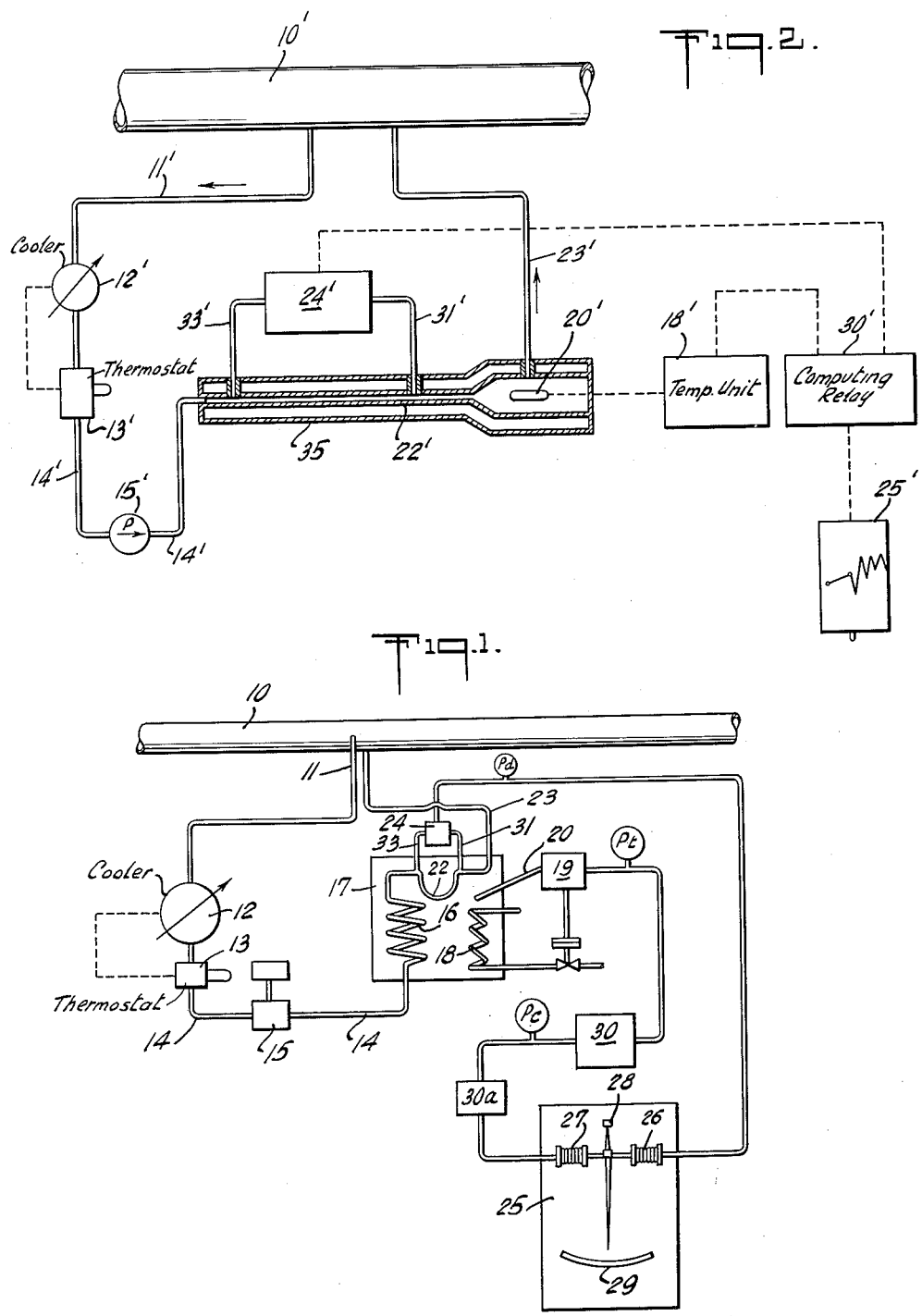

March 13, 1962  J. M. JONES, JR  3,024,643
APPARATUS AND METHOD FOR CONTINUOUSLY DETERMINING VISCOSITY
Filed March 20, 1957  2 Sheets-Sheet 2

United States Patent Office 3,024,643
Patented Mar. 13, 1962

3,024,643
APPARATUS AND METHOD FOR CONTINUOUSLY DETERMINING VISCOSITY
James M. Jones, Jr., Port Arthur, Tex., assignor to Texaco Inc., a corporation of Delaware
Filed Mar. 20, 1957, Ser. No. 647,310
12 Claims. (Cl. 73—55)

The present invention relates to a novel apparatus and method for continuously determining the viscosity of a liquid, and particularly for assuring a substantially constant standard temperature of the liquid as it flows through the viscosity measuring instrument.

The viscosity of a flowing stream of liquid has been determined by pumping the liquid at a constant rate of flow and a substantially constant temperature through a calibrated flow tube, and measuring the pressure drop between two points in the tube as an indication of viscosity.

A principal source of difficulty has been maintaining the temperature substantially constant as the liquid flows through the instrument, particularly where the normal temperature of the liquid in the system from which it is taken is substantially higher or substantially lower than the standard temperature at which the viscosity is to be measured. For example, a lubricating oil may leave a fractionating tower as a hot stream having a temperature of several hundred degrees F. Viscosities are ordinarily measured, however, at lower temperatures such as 130, 150 or 210° F. It is thus essential that the temperature of the lubricating oil be reduced to and maintained at the selected standard value while its viscosity is measured.

In accordance with this invention there is provided novel apparatus for continuously determining the viscosity of a liquid flowing through a conduit system comprising, in combination, a flow tube, means for sensing pressure drop across the flow tube, a pump having an inlet for the liquid and having an outlet connected to the flow tube for pumping the liquid at a constant rate through the flow tube, and heat exchange means for passing a cooling or heating fluid in indirect heat exchange relationship with the liquid up-stream of the pump to regulate the temperature of the liquid at the desired substantially constant standard value.

The temperature of the liquid leaving the heat exchange means is automatically regulated by providing a controller, such as a valve, for increasing or decreasing the rate of flow of cooling or heating fluid to the heat exchange means, and operating the controller by a temperature responsive device, such as a thermostat, located in a position to respond to the temperature of the liquid flowing through the conduit system. This temperature responsive device is operatively connected to the flow controller and acts to operate the latter to increase or decrease the flow rate of the heat exchange fluid automatically in response to variations from the desired temperature of the liquid, thereby maintaining substantially constant the temperature of the liquid leaving the heat exchanger.

Of course, when the liquid must flow a substantial distance from the heat exchanger to the flow tube, its temperature may drop slightly below the temperature for which the thermostat is set when the thermostat is located near the outlet of the heat exchanger. This can be compensated by setting the thermostat for a somewhat higher temperature than the standard temperature desired in the flow tube.

The invention will be described more in detail hereinafter with reference to the drawings wherein:

FIG. 1 is a schematic diagram showing one arrangement of apparatus for automatically and continuously measuring the viscosity of a stream of liquid which is bled from a main, this apparatus including a water bath for the flow tube, and a thermostat arranged adjacent the outlet of a heat exchanger;

FIG. 2 is a schematic flow diagram, part being shown in vertical mid-section, of a modified arrangement of apparatus for continuously measuring viscosity, without a water bath for the flow tube;

Figure 3:
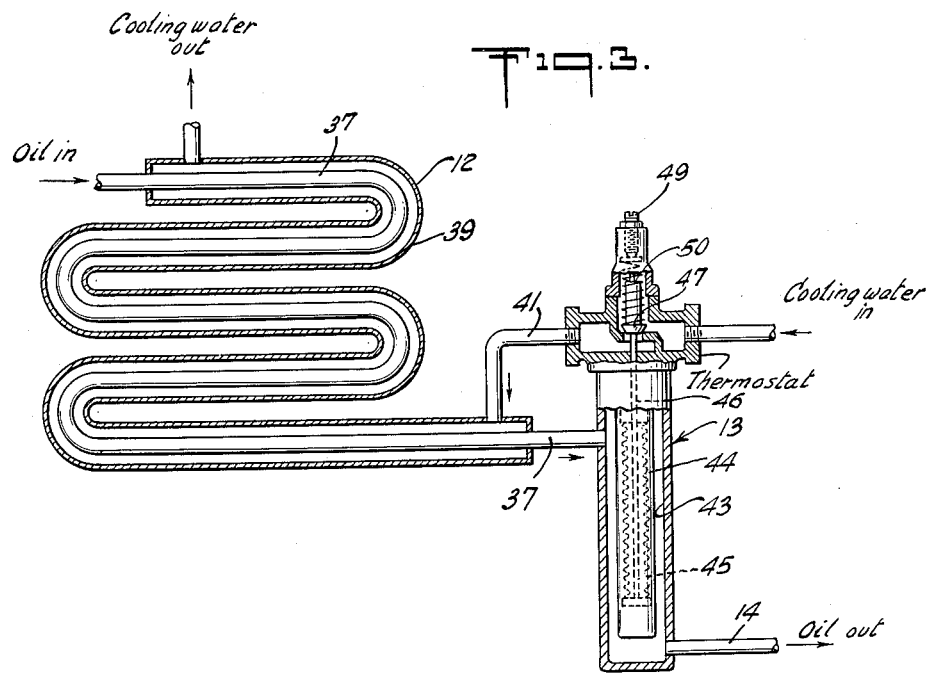
FIG. 3 is a schematic vertical mid-sectional view of a part of the apparatus of FIGS. 1 and 2 showing a heat exchanger and associated thermostat.

Referring to FIG. 1, a main 10 carries a flowing stream of the liquid whose viscosity is to be measured continuously, for example hot lubricating oil which is being drawn from a fractionating tower to tankage. A small take-off pipe 11 leads from main 10 to a heat exchanger 12, for continuously withdrawing a small part of the liquid stream from the main 10 and reducing its temperature to a value near to, or even slightly below, the standard temperature at which the viscosity of the oil is to be measured.

In the heat exchanger 12 the temperature of the oil is reduced by passing a stream of cooling water in indirect heat exchange relationship therewith while controlling the flow of the cooling water automatically by a thermostat 13 arranged in the discharge line 14 from the heat exchanger. This thermostat is operatively connected to a control valve in a water supply conduit (see FIG. 3) to increase the rate of flow when the oil temperature is too high at discharge, and to reduce the rate of flow when the temperature is too low at discharge.

After passing through thermostat 13, the oil then enters a pump 15 and is pumped at a constant rate of flow to a pipe coil 16 arranged within a constant temperature water bath 17 whose temperature is maintained constantly at the desired standard temperature for viscosity measurement by means of a steam coil 18 through which the rate of flow of steam is controlled automatically by a thermostat 19 having a sensing element 20 arranged within the bath. Excellent results have been obtained by controlling the liquid temperature leaving heat exchanger 12 slightly below the standard measuring temperature, and then bringing the temperature up to standard in bath 17. The temperature differential should not be less than 10 nor more than 20° F. to limit the load on the heating coil 16 so that a close approach between the temperature of the oil entering the measuring tube and the temperature of the water in the bath may be obtained.

The stream of liquid then enters a flow tube 22 having a cylindrical bore which is calibrated at a constant diameter, and returns by a conduit 23 to the main 10.

A pneumatic differential pressure responsive device 24, which is connected across flow tube 22 by ducts 31 and 33, sends compressed air impulses to actuate bellows 26 operating a viscosity indicating device 28 which indicates viscosity on a scale 29, and also can record viscosity constantly.

While every effort has been made to maintain constant the temperature of the liquid entering flow tube 22, experience has shown that there may occasionally be slight fluctuations in temperature which will give erroneous indications of viscosity on the scale 29 unless properly compensated. For example, if the temperature of the liquid rises above the standard temperature, the viscosity of the liquid naturally is reduced slightly so that the apparent viscosity indicated at 29 is actually lower than the true viscosity at the standard temperature; and vice-versa. Temperature compensation is provided by a temperature sensing device 20 which acts through a pneumatic reversing relay 30 and proportional relay 30a to operate a bellows 27 opposing the action of bellows 26, so as to correct for any slight changes in apparent viscosity which are solely the result of temperature fluctuations. This is fully disclosed and claimed in my copending U.S. application Ser. No. 376,949 which was filed August 27, 1953 and issued as Patent No. 2,791,902 on May 14, 1957, of which the present application is a continuation-in-part.

Referring to FIG. 2, there is shown a viscosimeter apparatus which is operated without a constant temperature water bath, thus reducing cost and bulk of the apparatus considerably. The liquid from main 10' is taken off through a conduit 11' and passes through a heat exchanger 12', a thermostat 13', a constant volume pump 15', a flow tube 22', and a return conduit 23', all as described in connection with FIG. 1. In this modification, however, reliance is placed on thermostat 13' to control the temperature of the liquid leaving heat exchanger 12' at such a constant value that no further heat control is required before or during its passage through flow tube 22'. The maintenance of constant temperature is further assured by surrounding flow tube 22' by heat insulation such as a jacket 35 which surrounds the flow tube in annularly spaced relation thereto and is either evacuated or is filled with heat insulating material.

As described in connection with FIG. 1, there may be some fluctuations in temperature so that the viscosity indicated by a measuring instrument 25' is kept at the true value by sensing the temperature with a temperature responsive device 20' arranged in an enlarged part of flow tube 22' directly in the line of flow of the liquid, and conveying signals therefrom through a temperature control unit 18' and a pneumatically actuated computing relay 30' to the measuring instrument 25'. This is disclosed in my copending U.S. application Ser. No. 507,853 filed May 12, 1955, of which the present application is a continuation-in-part.

Details of one suitable heat exchanger and thermostat are shown schematically in FIG. 3. The oil or other liquid whose viscosity is to be measured is passed through a coiled internal tube 37 which is surrounded by a tube 39 spaced annularly therefrom and carrying cooling water supplied by a pipe 41, so as to flow in countercurrent indirect heat exchange relationship with the oil. Oil leaves internal tube 37 and enters near the top of a casing 43 of thermostat 13, through which it flows and leaves at the bottom through pipe 14 leading to pump 15.

Within the casing 43 is a hollow bulb 44 filled with oil and containing a bellows 45 which is operatively coupled by a shaft 46 to a valve 47 controlling water flow through pipe 41. When the temperature of the liquid flowing through casing 43 rises or falls, the oil in bulb 44 expands or contracts, and the bellows 45 contracts or expands so that the flow of water is increased or decreased, respectively.

The setting of the thermostat 13 may be adjusted as desired by an adjusting screw 49 which adjusts the force with which a spring 50 bears against the top of valve 47, to regulate the oil temperature at any selected value within the range of the instrument.

Figure 4:
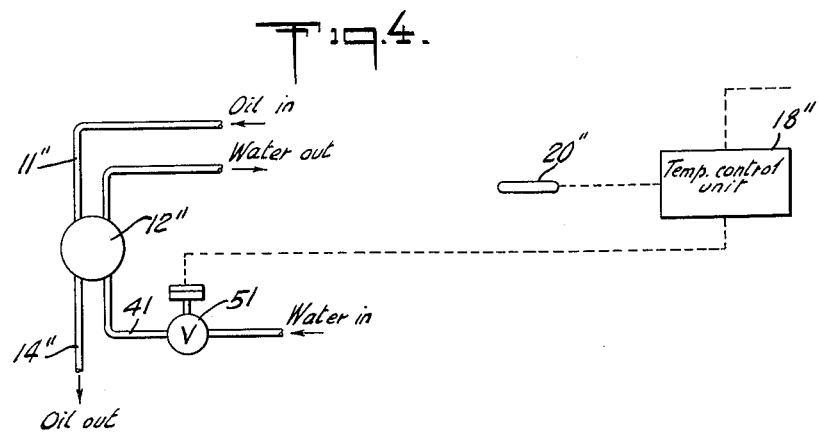
FIG. 4 is a schematic flow diagram showing only a part of a modified arrangement of apparatus wherein a thermostat is arranged in position to respond to the temperature of the liquid flowing through the flow tube of a viscosimeter.

In the modified arrangement shown in FIG. 4, the flow rate of cooling water through conduit 41 is controlled by a valve 51 which is operated automatically by a temperature responsive mechanism 18" actuated by a temperature sensing device 20" which may be positioned either directly in the line of flow of the liquid through flow tube 22', as shown in FIG. 2, or in a constant temperature bath 17, as shown in FIG. 1. Mechanism 18" may be a conventional pilot controller regulating a pneumatic or hydraulic control system for valve 51.

With the apparatus and method described in detail above, it is possible to maintain the temperature of the liquid substantially constant while continuously measuring its viscosity automatically to provide a sensitive and commercially advantageous way for controlling the operation of liquid treating devices, such as fractionating towers in an oil refinery.

Obviously, many modifications and variations of the invention, as hereinbefore set forth, may be made without departing from the spirit and scope thereof, and therefore only such limitations should be imposed as are indicated in the appended claims.

I claim:

1. Apparatus for continuously determining the viscosity of a liquid flowing through a conduit system comprising, in combination, a flow tube, means for sensing pressure drop across said flow tube, a pump having an inlet for said liquid and having an outlet connected to said flow tube for pumping said liquid at a constant rate through said flow tube, heat exchange means for passing a fluid in indirect heat exchange relationship with said liquid upstream of said pump to regulate said liquid at a substantially constant temperature; a conduit for said liquid connecting said heat exchange means to said pump; a controller for controlling the rate of flow of said fluid to said heat exchange means; and a temperature responsive device in position to respond to the temperature of the liquid flowing through said conduit system, said temperature responsive device being operatively connected to said controller and acting to operate said controller to increase and decrease the flow rate of said fluid automatically in response to variations from the desired constant temperature of said liquid, thereby maintaining substantially constant the temperature of said liquid leaving said heat exchange means and entering said pump.

2. Apparatus in accordance with claim 1, said heat exchange means comprising a first conduit for said liquid and a second conduit for said fluid, one within the other, and said controller being a valve in said second conduit.

3. Apparatus in accordance with claim 1, also comprising means for adjusting said temperature responsive device to change the desired constant temperature.

4. Apparatus in accordance with claim 1, said flow tube being thermally insulated from its surroundings.

5. Apparatus in accordance with claim 1, wherein said temperature responsive device is located in said flow tube.

6. Apparatus in accordance with claim 1, also comprising a constant temperature bath enclosing said flow tube, and means for maintaining constant the temperature of said bath.

7. Apparatus in accordance with claim 6, wherein said last named means includes a second temperature responsive device located in said constant temperature bath.

8. In apparatus for continuously determining the viscosity of a liquid, comprising a flow tube, means for sensing pressure drop across said flow tube, and a pump having an inlet for said liquid and having an outlet connected to said flow tube for pumping said liquid at a constant rate through said flow tube: the improvement which comprises, heat exchange means for passing a fluid in indirect heat exchange relationship with said liquid upstream of said pump to regulate the temperature of said liquid at a substantially constant value; conduit means connecting said heat exchange means to said inlet; a controller for controlling the rate of flow of said fluid to said heat exchange means; and a temperature responsive device in position to respond to the temperature of the liquid leaving said heat exchange means, said temperature responsive device being operatively connected to said controller and acting to operate said controller to increase and decrease the flow rate of said fluid automatically in response to variations from the desired constant temperature of said liquid, thereby maintaining substantially constant the temperature of said liquid leaving said heat exchange means and entering said pump.

9. A method for continuously determining the viscosity of a liquid at a desired temperature which is substantially different from the normal temperature of said liquid, said method comprising passing a flowing stream of said liquid in indirect heat exchange relationship with a fluid to change the temperature thereof substantially to said desired temperature; passing said liquid at said desired temperature to a pump; pumping said liquid at a constant rate of flow through a flow tube; measuring the pressure drop through said flow tube as a function of viscosity; sensing temperature changes downstream of the locality of heat exchange; and maintaining said desired temperature by regulating the flow of said fluid in response to the temperature changes so sensed by increasing and decreasing the flow rate of said fluid automatically in response to variations from the desired temperature of said liquid downstream of said locality.

10. A method in accordance with claim 9 wherein said desired temperature is below said normal temperature, and wherein said fluid is colder than said desired temperature.

11. A method for continuously determining the viscosity of a liquid at a desired temperature which is substantially lower than the normal temperature thereof, said method comprising passing in indirect heat exchange relationship with said liquid in a first locality a cooling fluid whose temperature is below said desired temperature and cooling said liquid to a substantially constant temperature below said desired temperature; passing said liquid at said substantially constant temperature to a pump; pumping said liquid with a pump at a constant rate of flow in heat exchange relationship at a second locality with a second fluid whose temperataure is sufficiently higher than said liquid to raise the temperature thereof up to said desired temperature, and then through a flow tube; measuring the pressure drop across said flow tube as a function of viscosity; sensing temperature variations in said liquid at a third locality downstream of said first locality of heat exchange; and regulating the flow of said cooling fluid in response to changes in the temperature of said liquid at said third locality by increasing and decreasing the flow rate of said cooling fluid automatically in response to variations in the temperature of said liquid at said third locality.

12. A method in accordance with claim 11, wherein said third locality is upstream of said pump.

References Cited in the file of this patent

UNITED STATES PATENTS

| | | |
|---|---|---|
| 2,266,947 | Arndt | Dec. 23, 1941 |
| 2,322,814 | Binckley | June 29, 1943 |
| 2,596,812 | Carson | May 13, 1952 |
| 2,645,461 | Brown et al. | July 14, 1953 |
| 2,705,420 | Bryan et al. | Apr. 5, 1955 |

FOREIGN PATENTS

| | | |
|---|---|---|
| 657,696 | Great Britain | Sept. 26, 1951 |